United States Patent
Grubb

(10) Patent No.: US 7,995,921 B2
(45) Date of Patent: Aug. 9, 2011

(54) BANDED SEMICONDUCTOR OPTICAL AMPLIFIERS AND WAVEBLOCKERS

(75) Inventor: Stephen G. Grubb, Reisterstown, MD (US)

(73) Assignee: Infinera Corporation, Sunnyvale, CA (US)

( * ) Notice: Subject to any disclaimer, the term of this patent is extended or adjusted under 35 U.S.C. 154(b) by 828 days.

(21) Appl. No.: 11/832,806

(22) Filed: Aug. 2, 2007

(65) Prior Publication Data
US 2009/0034974 A1 Feb. 5, 2009

(51) Int. Cl.
*H04J 14/02* (2006.01)
(52) U.S. Cl. .............. 398/79; 398/83; 398/59; 398/48; 398/159; 398/160; 385/24; 385/37; 385/16; 385/17; 385/18; 359/337; 359/341.2; 359/334
(58) Field of Classification Search .......... 398/79, 398/83, 82, 45, 84, 85, 59, 158, 159, 160, 398/48, 49, 50, 51; 385/24, 16, 17, 18, 37; 359/337, 341, 349, 341.1, 341.2, 334
See application file for complete search history.

(56) References Cited

U.S. PATENT DOCUMENTS

| | | | |
|---|---|---|---|
| 6,243,179 B1 * | 6/2001 | Thompson et al. | 398/9 |
| 6,602,002 B1 | 8/2003 | Srivastava et al. | |
| 6,868,201 B1 * | 3/2005 | Johnson et al. | 385/24 |
| 7,155,124 B2 * | 12/2006 | Peddanarappagari et al. | 398/37 |
| 2002/0015553 A1 * | 2/2002 | Claringburn et al. | 385/24 |

* cited by examiner

*Primary Examiner* — Hanh Phan
(74) *Attorney, Agent, or Firm* — David L. Soltz; Michael V. North

(57) ABSTRACT

Embodiments of the present invention provide an array of semiconductor optical amplifiers, within a photonic integrated circuit (hereinafter, "PIC"), that apply a gain to one or more optical bands within a WDM signal. According to various embodiments of the invention this array of SOAs can function as both an amplifier and a ROADM by adjusting the gain characteristics of one or more of the SOAs within the array. A band within the WDM signal may be blocked by adjusting the SOA, corresponding to the particular band, to attenuate the band below a threshold.

18 Claims, 3 Drawing Sheets

BANDED SEMICONDUCTOR OPTICAL AMPLIFIERS AND WAVEBLOCKERS

BACKGROUND

A. Technical Field

This invention relates generally to optical communication networking systems, and more particularly, to an array of banded semiconductor operational amplifiers integrated within a photonic integrated circuit.

B. Background of the Invention

The importance of optical networks in today's society is well understood. Many optical communication systems use wavelength division multiplexing (hereinafter, "WDM"), which multiplexes and routes wavelengths or channels between nodes within the network. WDM optical systems allow a service provider to scale a network by adding or removing wavelengths which allows scalability of bandwidth with minimal physical buildout of the network.

WDM networks can increase the total number of channels and density of these channels to improve network bandwidth. Dense wavelength division multiplexed (hereinafter, "DWDM") systems and course wavelength division multiplexed (hereinafter, "CWDM") systems provide a service provider with different channel characteristics that may be applied to various optical networking applications.

CWDM systems transmit fewer channels and uses wider spacing between the channels when compared to DWDM systems. As a result, CWDM systems are typically deployed in short to mid haul applications whereas DWDM systems are primarily used in long haul scenarios. The management of these optical systems and the wavelengths therein, may vary depending on the particular characteristics of the system and the environment in which it operates.

An optical add drop multiplexer (hereinafter, "OADM") is one such device used in WDM systems for multiplexing and routing different channels of light into or out of a WDM signal. In performing an optical demultiplexing or drop operation, an OADM receives a WDM signal and separates at least one wavelength from the WDM signal. An OADM also performs an optical multiplexing or add operation by combining at least two wavelengths into a single WDM signal.

A reconfigurable OADM (hereinafter, "ROADM") allows a service provider to dynamically configure wavelengths that are added and/or dropped. A typical ROADM comprises three stages: an optical demultiplexer, a structure that allows for reconfiguration of added and/or dropped wavelengths, and an optical multiplexer. One skilled in the art will recognize that there are a variety of manufacturing technologies used to design and construct these ROADMs. For example, technologies such as thin film filters, fiber gratings with optical circulators, free space grating devices and integrated planar arrayed waveguide gratings may be used to build ROADMs. Thin film filters are known for their high performance in lower channel count applications and planar light circuits are stronger in higher channel counts with a high degree of integration.

Optical systems require the signals within a network be maintained within a particular power range. In order for networking nodes to function properly, an optical signal should meet certain parameters such as power, signal-to-noise ratio, etc. If an optical signal fails to comply with these parameters, then errors may occur within the network.

Amplifiers within the optical system are provided to maintain optical signal power within a preferred range. Examples of such amplifiers include Erbium-doped fiber amplifiers (hereinafter, "EDFA") and semiconductor optical amplifiers (hereinafter, "SOA"). EDFAs are commonly deployed within legacy optical networks but have bandwidth constraints that limit their applications. EDFAs typically operate from bandwidths of 1530 nm to 1620 nm and fail to provide proper amplification for wavelengths outside of this bandwidth range.

SOAs are currently being deployed within optical systems and provide improved bandwidth performance over the previously described EDFAs. For example, SOAs can achieve relatively higher bandwidths on the order of 60 to 100 nm. A typical bandwidth range addressable by SOAs is between 1240 nm to 1675 nm, which is much larger than EDFAs provide.

As the need to address bandwidths within a broader range increase, the amplification and maintenance of optical signals within WDM networks becomes more challenging.

SUMMARY OF THE INVENTION

Embodiments of the present invention provide an array of semiconductor optical amplifiers, within a photonic integrated circuit (hereinafter, "PIC"), that apply a gain to one or more optical bands within a WDM signal. According to various embodiments of the invention this array of SOAs can function as a ROADM by adjusting the gain characteristics of one or more of the SOAs within the array. A band within the WDM signal may be blocked by adjusting the SOA, corresponding to the particular band, to attenuate the band below a threshold.

In various embodiments of the invention, a multi-band optical amplifier is realized using the array of SOAs. Each of the SOAs is able to amplify a particular band(s) of the WDM signal. The gain characteristics of an SOA are at least partially defined by its active layer, and in particular, the band gap within the active layer itself. Accordingly, the array of SOAs will comprise SOAs of differing active layer band gaps that allow amplification of the different bands within the WDM signal.

An optical demultiplexer receives a WDM signal and separates it into its component optical bands or optical signal groups. Each of these bands/groups is routed to an SOA having an amplification bandwidth containing the wavelengths within the optical band or optical signal group. Depending on the gains applied across the SOA array certain bands may be amplified and certain bands may be attenuated. The amplified bands are subsequently multiplexed into a WDM signal and further transmitted onto the network.

The SOA array may be supplemented to provide ROADM functionality in which optical bands are either added to or dropped from a WDM signal. A coupler may be positioned prior to the input of the SOA array that taps a portion of a WDM signal. This tapped WDM signal provides broadcast drop functionality requirements of the ROADM. In addition, a second coupler may be located behind the SOA array to provide broadcast add functionality requirements of the ROADM. The coupler may also be used by the service provider to reintroduce a banded signal to the original signal at another point along the network. This configuration allows a service provider more options in configuring a network by limiting the amount of banded signals from being processed at a particular point by the SOAs, thus reducing cost and power consumption.

In certain embodiments, the banded optical signal are received by an optical demultiplexer that separates the WDM signal into optical bands or signal groups, which comprises multiple wavelengths within the bandwidth of the band. In various embodiments of the invention, the optical demultiplexer comprises a thin filmed filter (TFF), which is a series of coarse dielectric filters that separate these bands. Each of the demultiplexed bands is routed to a corresponding SOA that applies a gain or attenuation to the particular band. The gain across each of the SOAs is controlled at least in part by pumping the active region of the SOA. Depending on the applied gain, each band is either amplified, attenuated (blocked), or passed through. The blocked band may be reintroduced to the original banded signal after the individual banded signals are multiplexed.

In other embodiments, a more advanced amplifier/ROADM comprising a multi-stage array of SOAs and switch is shown. One skilled in the art will recognize that various types of optical switches may be employed including MEMS devices, Planar Light Circuits ("PLCs"), etc. This mid-stage switch allows the network provider to add or drop a banded signal from the first stage array of SOAs before entering the second stage array of SOAs. Therefore, a previously blocked banded signal may be reintroduced mid-stage to the original signal and only be processed by the second stage array of SOAs. The banded signals are subsequently multiplexed by an optical multiplexer, such as the thin film filter previously described, and transported throughout the network.

Certain features and advantages of the invention have been generally described in this summary section; however, additional features, advantages, and embodiments are presented herein or will be apparent in view of the drawings, specification, and claims hereof. Accordingly, it should be understood that the scope of the invention is not limited by the particular characterizations presented in this summary section.

BRIEF DESCRIPTION OF THE DRAWINGS

Reference will be made to embodiments of the present invention, examples of which are shown in the accompanying figures. Those figures are intended to be illustrative, however, rather than limiting. Although the present invention is generally described in the context of the embodiments shown in the accompanying figures, the scope of the present invention is not restricted to the details of those particular embodiments.

DETAILED DESCRIPTION OF THE PREFERRED EMBODIMENTS

Embodiments of the present invention provide an array of semiconductor optical amplifiers, within a photonic integrated circuit (hereinafter, "PIC"), that apply a gain to one or more optical bands within a WDM signal. According to various embodiments of the invention this array of SOAs can function as a ROADM by adjusting the gain characteristics of one or more of the SOAs within the array. A band(s) within the WDM signal may be blocked by adjusting the SOA, corresponding to the particular band, to attenuate the band below a threshold.

In the following description, for the purpose of explanation, specific details are set forth in order, by the use of concrete examples, to provide a sound understanding of the present invention. It will be apparent; however, that the present invention may be practiced without some or even all of those details, and it will be recognized that embodiments of the present invention, some of which are described below, may be incorporated into a number of different devices, systems, and methods. Structures, devices, and methods depicted in block diagram are merely illustrative of exemplary embodiments of the present invention and are included in that form in order to avoid obscuring essential teachings of the present invention.

Furthermore, connections between components in the figures are not restricted to connections that are effected directly. Instead, connections illustrated in the figures between components may be modified or otherwise changed through the addition thereto of intermediary components, without departing from the teachings of the present invention.

Reference in the specification to "one embodiment" or "an embodiment" indicate that a particular feature, structure, characteristic, function, or method step described in connection with that embodiment is included in at least one embodiment of the present invention. The various uses of the phrase "in one embodiment" at different locations throughout the specification do not necessarily constitute multiple references to a single embodiment of the present invention.

Figure 1:
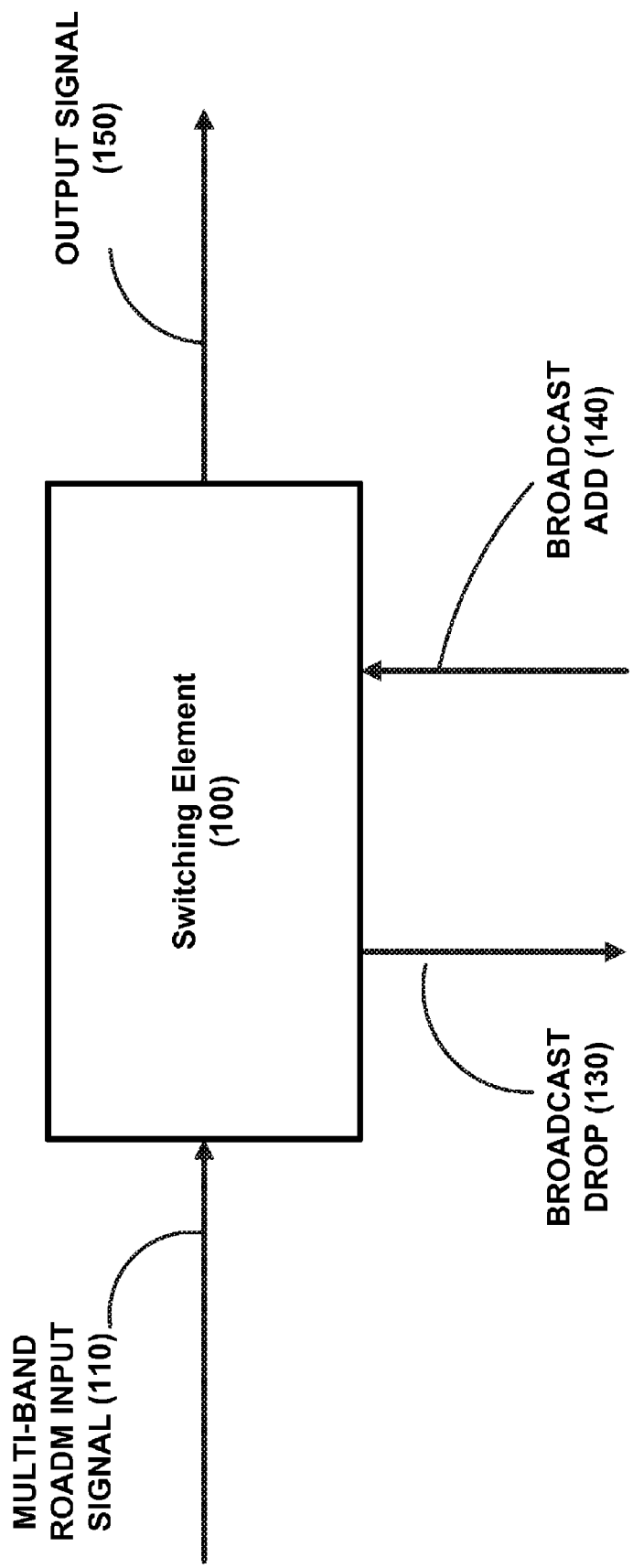
FIG. 1 is a schematic illustration of network ports and associated electronic processing modules within a network node according to various embodiments of the invention.

FIG. 1 is an illustration of a switching element 100 according to various embodiments of the present invention. Switching element 100 receives a WDM optical signal 110 at its input. The switching element may be a reconfigurable optical add/drop multiplexer (ROADM) of a wavelength division multiplexed system. In a ROADM, switching elements inside the ROADM allow each input banded signal to be dynamically added, dropped, or passed through the ROADM. ROADMs are preferred due to their increased functionality and flexibility in changing the topology of a network and reconfiguring the connections therein.

In certain embodiments of the invention, the waveguide 110 carries a plurality of optical wavelength signals spanning from about 1290 nm to about 1610 nm. The wavelengths within this spectrum are defined by 6 bands, whereby each band covers a predetermined spectrum. In these implementations, a single multi-banded optical signal enters the switching element 100 where the switching element 100 can operably function as an ROADM or wavelength blocker by adding, dropping, or blocking a banded signal from propagating throughout the network. Thus, a switching element may also perform a broadcast drop 130 of the WDM signal while allowing the non-tapped WDM signal to be processed within the SOA array.

An optical signal of the channel that was dropped can be reintroduced to the original banded signal at the switching element 100. Such a signal enters the switching element through the broadcast add 140 input and subsequently combined with at least one other optical signal. The resultant WDM optical signal is then sent as an output signal 150 across the network for further processing.

Figure 2:
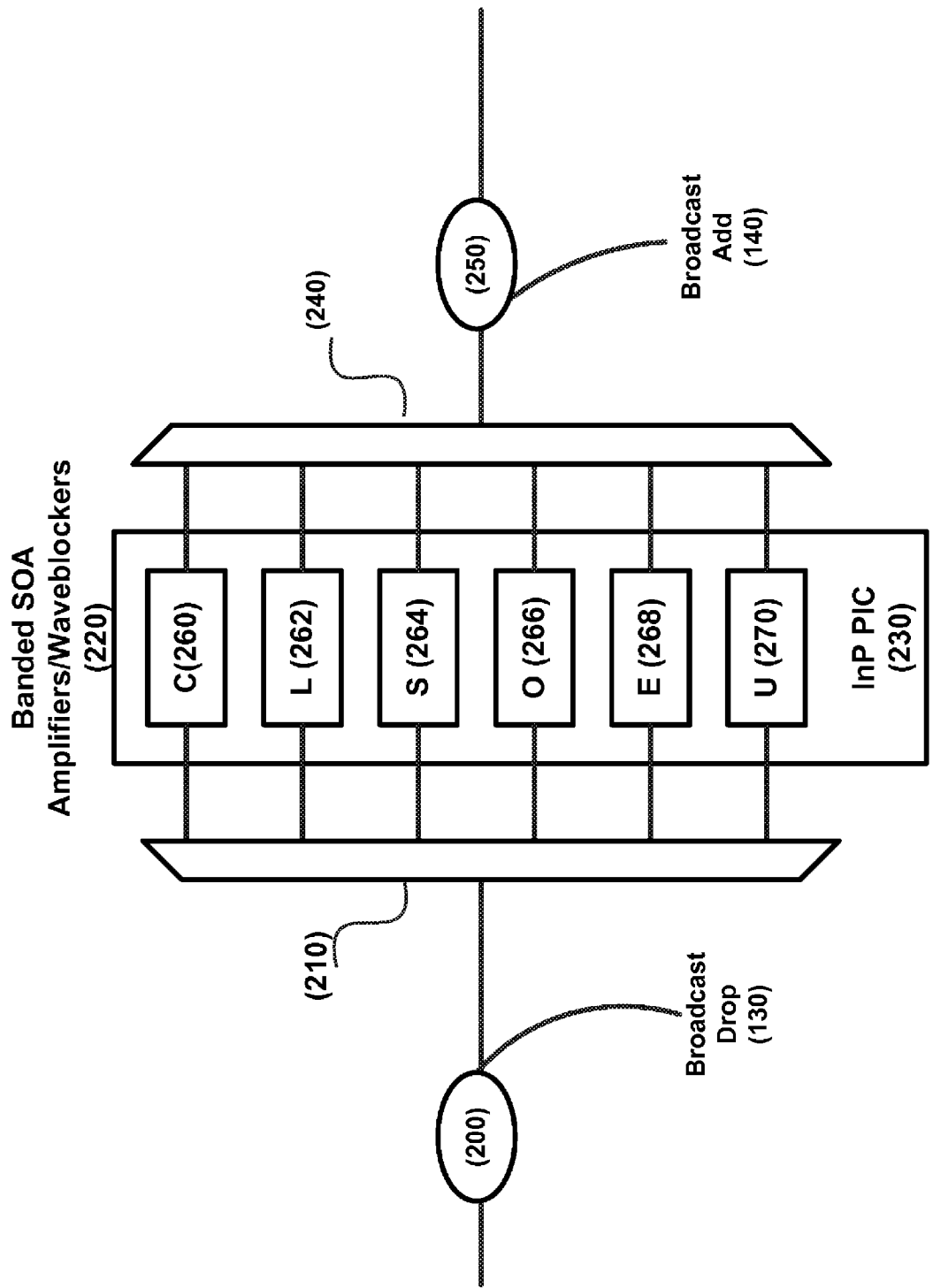
FIG. 2 illustrates an older generation transponder and newer generation transponder according to various embodiments of the invention.

FIG. 2 is a diagram of an array of SOAs 220 within a single photonic integrated circuit 230 according to various embodiments of the invention. In these embodiments, the SOAs 220 are arranged as an array of banded spectrum amplifiers, including but not limited to, C-band 260, L-band 262, S-band 264, O-band 266, E-band 268, and U-band 270. Each of the aforementioned SOAs 220 are configured to handle wavelength bands in the following ranges: O-band 266 from about 1260 nm to about 1360 nm, E-band 268 from about 1360 nm to about 1460 nm, S-band 264 from about 1460 nm to 1530 nm, C-band 260 from about 1530 nm to about 1565 nm, L-band 262 from about 1565 nm to about 1625 nm, and U-band 270 from about 1625 nm to about 1675 nm. The SOAs are configured to allow a banded signal to be added, dropped, or passed along throughout the network. In essence, the SOAs 220 are operably configured to be an amplifier, thus creating a ROADM, or a waveblocker/attenuator which eliminates a band from passing along throughout the network. A gain is provide by the SOAs 220 to each respective band of signals, in which the SOAs 220 are turned off whereby the SOAs 220 act as a waveblocker or turned on or apply gain and act as an amplifier on a band.

FIG. 2 further comprises a demultiplexer 210 (hereinafter, "demux") operably connected to the banded SOAs 220 for receiving the waveguide and splitting a WDM signal into a plurality of banded signals so that each banded signal can propagate along to its corresponding banded SOAs 220. Furthermore, a multiplexer 240 (hereinafter, "mux") is operably connected to the SOAs 220, for receiving different banded signals and multiplexing the different banded signals onto to a single waveguide. The demux 210 and mux 240 may be, but are not limited to, an arrayed waveguide gratings (hereinafter, "AWG") which are commonly used as optical multiplexers/demultiplexer in WDM systems. The AWGs are used to multiplex bands of several wavelengths onto a single optical fiber at the transmission end and are also used as demultiplexers to separate individual bands of different wavelength groups at the receiving end of an optical communication network.

In other embodiments of the invention, the demux 210 and mux 240 comprise a thin filmed filter (hereinafter, "TFF"). TFFs comprise a series of coarse dielectric filters that will separate theses widely spaced bands. The TFF may have preferred performance characteristics when applied to the multiplexing and demultiplexing of wavelength bands as well as lower channel count applications.

A coupler 200 is operably connected to the waveguide prior to the demux 210 and another coupler 250 is operably connected to the waveguide after the SOA array. Coupler 200 can be configured to act as a broadcast drop in which a certain fraction of the light from the waveguide is split off from the original waveguide signal. The coupler 250 allows a broadcast to be added to the multiplexed signal thereby allowing a previously dropped or blocked signal to be reintroduced to the original optical signal for further propagation along the network.

Figure 3:
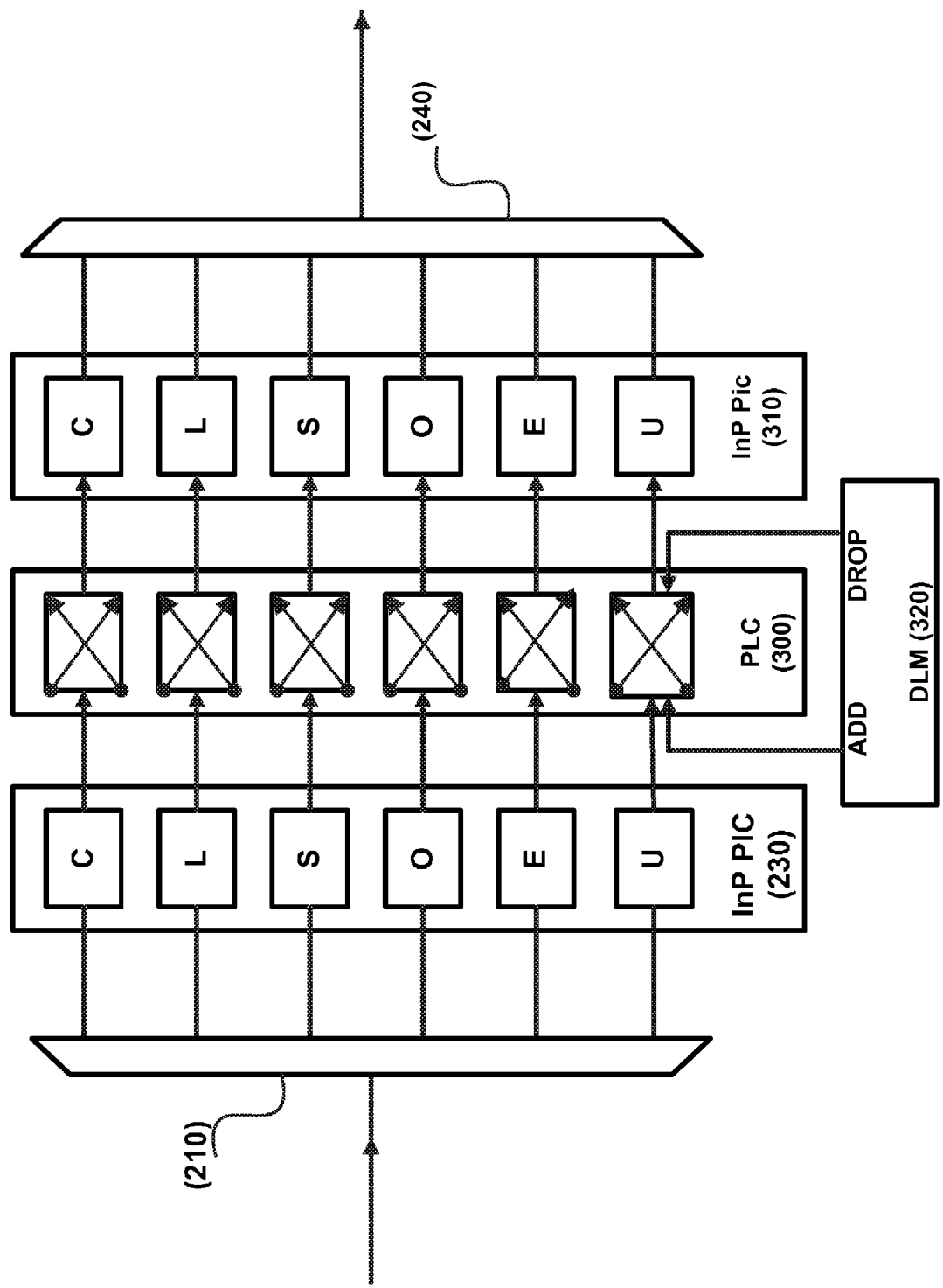
FIG. 3 is a general diagram of a configurable multi-rate port and associated electronic processing modules according to various embodiments of the invention.

Although FIG. 2 and the accompanying text describe banded SOAs on a single PIC with the signals being capable of being dropped or added before the signals are demultiplexed or multiplexed, the principles illustrated can be straightforwardly extended to an apparatus comprising multiple PICs and a device mid-stage which allows a banded signal to be added, dropped, or passed along. For example, FIG. 3 is an illustration of a more advanced amplifier/ROADM comprising a two stage SOA array within PIC 230 and PIC 310 respectively, a planar light circuit (hereinafter, "PLC") 300, a digital line module (hereinafter, DLM) (hereinafter, "DLM") 320, a demux 210 and mux 240. As previously mentioned the two-stage SOA array, PLC, and DLM may be integrated within the same PIC. A DLM is an integrated device that provides conversion between optical and electrical domains as well as optical multiplexing and demultiplexing operations.

As mentioned in FIG. 2, PIC 230 is coupled to the demux 210 to receive demultiplexed banded signals. An array of SOAs within PIC 230 are configured to block banded signals from propagating on the pass-through path when they are dropped to a drop path or when an optical banded signal is being added from an add path. If the optical signal is to continue propagating on the pass-through path, the corresponding SOAs is turned on and amplifies the optical banded signal to compensate for losses and signal degradations introduced by the optical network. The PLC 300, coupled to PIC 230, receives the individual optical banded signals respectively and provides both pass-through and switching functionality between the PICs. The PLC 300 may also allow one or more bands to be inserted within the multi-stage SOA array. As a result, the multi-stage SOA is able to dynamically add/drop bands internally and allow for reconfiguration of these add/drop connections.

FIG. 3 further comprises a second stage array of SOAs within PIC 310 coupled to PLC 300 for receiving individual banded signals. The same process as describe in FIG. 2 will take place, the individual banded signals will be received by the array of SOAs within PIC 310 whereby the signals will be dropped, blocked, or added. Either the current will be turned off so that the banded signal will be attenuated and thus blocked or the current will be turned on so amplification will occur and the signal will be allowed to continue propagating along to mux 240. Mux 240 is operably connected to PIC 310, whereby the individual banded signals are multiplexed into a single banded optical signal for transport throughout the network.

While the invention has been described in conjunction with several specific embodiments, it is evident to those skilled in the art that many further alternatives, modifications, and variations will be apparent in light of the foregoing description. For example, any number of PICs comprising multiple SOAs may be used dependent upon network configurations. The devices shown are integrated but may operate as stand alone devices. Additionally, SOAs, although configured for optimization of a single band, may be optimized for multiple bands.

I claim:

1. An apparatus comprising:

an optical waveguide that supplies a first wavelength division multiplexed (WDM) signal, the first WDM signal including a plurality of first optical signals, each of which having a corresponding one of a plurality of wavelengths;

a first coupler, coupled to the waveguide, having an input to receive the plurality of first optical signals and first and second outputs, the first output supplying a first portion of each of the plurality of first optical signals as a plurality of second optical signals, and the second output supplying a second portion of each of the plurality of optical signals as a plurality of third optical signals, each of the plurality of second optical signals having a corresponding one of the plurality of wavelengths and each of the plurality of third optical signals having a corresponding one of the plurality of wavelengths;

a demultiplexer, coupled to the coupler, that receives the plurality of second optical signals from the first coupler, the demultiplexer having a first output and a second output, the first output of the demultiplexer supplying a first group of the plurality of second optical signals and the second output supplying a second group of the plurality of second optical signals;

a first semiconductor optical amplifier (SOA) that selectively imparts a first gain over a C-band, each of the first group of the plurality of second optical signals having a corresponding wavelength within a first group of the plurality of wavelengths, the first group of the plurality of wavelengths being within the C-band, the first SOA supplying a first amplified group of the plurality of second optical signals; and a second SOA that selectively imparts a second gain over a an L-band, each of the second group of the plurality of second optical signals having a corresponding wavelength within a second group of the plurality of wavelengths, the second group of the plurality of wavelengths being within the L band, the second SOA supplying a second amplified group of the plurality of second optical signals;

a multiplexer that receives the first and second amplified groups of the plurality of second optical signals, the multiplexer having an output, such that the first and second amplified groups of the plurality of second optical signals are combined at the output; and a second coupler, coupled to the multiplexer, the second coupler receiving the first and second amplified groups of the second plurality of optical signals and a fourth optical signal having a wavelength outside the first and second bands, the second coupler having an output that supplies a second WDM signal including the fourth optical signal and the first and second amplified groups of the plurality of second optical signals.

2. The apparatus of claim 1 further comprising a third SOA that imparts a third gain over a S-band.

3. The system of claim 1 wherein the first SOA selectively attenuates a power level of the first group of the plurality of second optical signals.

4. The apparatus of claim 1 wherein the plurality of wavelengths are within a range from 1240 nm to 1675 nm.

5. The apparatus of claim 1 wherein the demultiplexer and multiplexer comprise a thin film filter.

6. The apparatus of claim 5 wherein the thin film filter comprises a series of dielectric filters.

7. The apparatus of claim 1 wherein the multiplexer and the demultiplexer comprise an arrayed wavelength grating.

8. The apparatus of claim 1 further including a substrate, the substrate including InP, the multiplexer, demultiplexer and first and second SOAs being provided on the substrate.

9. A system, comprising:
an optical waveguide that supplies a first wavelength division multiplexed (WDM) signal, the first WDM signal including a plurality of optical signals, each of which having a corresponding one of a plurality of wavelengths;

a demultiplexer coupled to the first optical waveguide, the demultiplexer receiving the first WDM signal, the demultiplexer having a first output and a second output, the first output of the demultiplexer supplying a first group of optical signals selected from the plurality of optical signals and the second output supplying a second group of optical signals selected from the plurality of optical signals;

a first semiconductor optical amplifier (SOA) that selectively imparts a first gain over a C-band, each of the first group of optical signals having a corresponding wavelength within a first group of the plurality of wavelengths, the first group of the plurality of wavelengths being within the C-band;

a second SOA that imparts a second gain over an L-band, each of the second group of optical signals having a corresponding wavelength within a second group of the plurality of wavelengths, the second group of the plurality of wavelengths being within the L band;

a first substrate, the first and second SOAs being provided on the first substrate;

a first switch and a second switch coupled to the first and second SOAs, respectively;

a second substrate, the first and second switches being provided on the second substrate;

a third SOA configured to receive an output from the first switch and a fourth SOA configured to receive an output from the second switch, the third and fourth SOAs supplying third and fourth groups of optical signals, respectively, the third SOA being configured to impart a third gain over an S-band, and the fourth SOA being configured to impart a gain over an O-band;

a third substrate, the third and fourth SOAs being provided on the third substrate; and a multiplexer configured to receive the third and fourth groups of optical signals and supply a second WDM signal including the third and fourth groups of optical signals.

10. The system of claim 9 further comprising a fifth SOA that imparts a fifth gain over an E-band, the fifth SOA being provided on the first substrate.

11. The system of claim 9 further comprising a sixth SOA that is configured to provide a sixth gain over a U-band.

12. The system of claim 9 wherein the first SOA selectively attenuates a power associated with the first group of the plurality of optical signals.

13. The system of claim 9 wherein plurality of wavelengths is within a range from 1240 nm to 1675 nm.

14. The system of claim 9 wherein the demultiplexer and multiplexer comprise a thin film filter.

15. The system of claim 9 wherein the multiplexer and the demultiplexer comprise an arrayed wavelength grating.

16. The system of claim 9 further comprising a digital line module, coupled to the switch, that provides conversion between optical and electrical domains and optical multiplexing/demultiplexing.

17. An apparatus, comprising:
a first optical waveguide that supplies a first wavelength division multiplexed (WDM) optical signal, the first WDM signal including a plurality of optical signals, each of which having a corresponding one of a plurality of wavelengths;

a demultiplexer coupled to the first optical waveguide, the demultiplexer receiving the first WDM signal, the demultiplexer having a first output and a second output, the first output of the demultiplexer supplying a first group of optical signals selected from the plurality of optical signals and the second output supplying a second group of optical signals selected from the plurality of optical signals;

a first semiconductor optical amplifier (SOA) that imparts a first gain over a C-band, each of the first group of optical signals having a corresponding wavelength within a first group of the plurality of wavelengths, the first group of the plurality of wavelengths being within the C-band;

a second SOA that imparts a second gain over an L-band, each of the second group of optical signals having a corresponding wavelength within a second group of the plurality of wavelengths, the second group of the plurality of wavelengths being within the L band;

a first switch and a second switch coupled to the first and second SOAs, respectively;

a third SOA configured to receive an output from the first switch and a fourth SOA configured to receive an output from the second switch, the third and fourth SOAs supplying third and fourth groups of optical signals, respectively;

a multiplexer configured to receive the third and fourth groups of optical signals and supply a second WDM signal including the third and fourth groups of optical signals; and a substrate, the demultiplexer; first, second, third, and fourth SOAs; the first and second switches; and the multiplexer are provided on the substrate.

18. The apparatus of claim 17 wherein the plurality of wavelengths is within a range from 1240 nm to 1675 nm.

* * * * *